United States Patent Office 3,443,255
Patented May 6, 1969

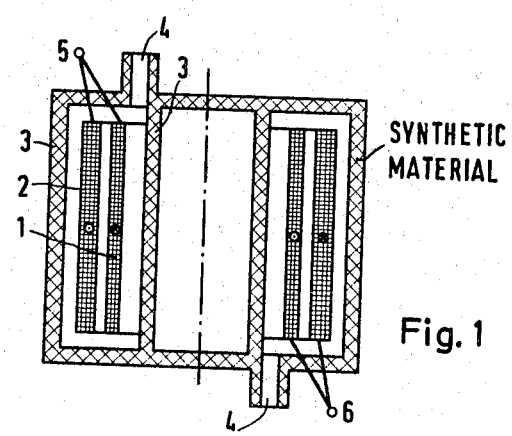
Fig. 1
Fig. 1a
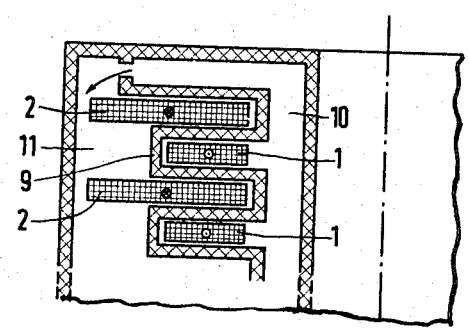
Fig. 2
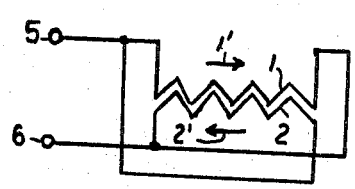
Fig. 3

3,443,255
CURRENT LIMITING DEVICE
Ernst Massar, Erlangen, Germany, assignor to Siemens Aktiengesellschaft, Berlin, Germany, a corporation of Germany
Filed Apr. 25, 1967, Ser. No. 633,483
Claims priority, application Germany, Apr. 26, 1966, S 103,419
Int. Cl. H01f 27/10
U.S. Cl. 336—58                                    12 Claims

ABSTRACT OF THE DISCLOSURE

A current limiting device preferably for use in alternating-current distribution systems consists essentially of two parallel connected and inductively interlinked inductance windings which have substantially equal but mutually opposed ampere turns so that their respective reactances substantially cancel each other. At least one of the two windings is formed of superconducting material and has its critical magnetic field strength at the limit value of the current to be controlled. When the limit current is exceeded, the critical field is reached so that the previously superconducting winding goes normal and the field of the other winding becomes effective to limit the current.

---

My invention relates to devices for limiting overload current to a given permissible value. Such devices are used especally in power distribution systems for reducing the power to be switched off by circuit breakers or for limiting any occurring short-circuit currents as may otherwise become so intensive that the resulting excessive mechanical forces will damage or destroy system components. It has become known to prevent such damage in alternating-current distribution systems by inserting choke coils into the load circuit. These coils, however, produce a voltage drop and, on account of their ohmic resistance, cause considerable losses during continuous normal operation of the system. In order to render a current limiting device effective only when the permissible current intensity is exceeded, it has been further known to provide the load circuit with a series oscillatory circuit composed of a saturable reactor and a capacitor and tuned to the line frequency to act as a band pass. When the permissible current intensity is exceeded, the reactor saturates and thus varies its inductivity. This detunes the oscillatory circuit thereby increasing its impedance to the alternating load current. Such oscillatory limiters, however, have a considerable inertia since they can become effective only after the iron of the reactor is saturated. The limiting effect, therefore, may commence after the overload or short-circuit has already caused damage.

It is an object of my invention to devise a rapidly responsive current limiting device which virtually does not affect the load circuit during rated-current operation and which secures a considerably more rapid response than obtainable with the aid of saturable reactor devices.

To this end, and in accordance with my invention, the current limiting device comprises two electrically parallel connected inductance windings which have approximately equal but mutually opposed ampere turns, and at least one of these two windings consists entirely or partially of a superconducting material and has its critical field strength or the corresponding critical current intensity so rated as to become exceeded when the current to be limited rises beyond the desired limit value, so that then the normally superconducting winding converts to the state of normal conductivity.

During normal operation within the range of rated-current intensities, the reactances of the two windings substantially cancel each other since only the stray field remains effective. Consequently, a slight or negligible inductive impedance remains effective in the load circuit. The ohmic resistance can be reduced to a particularly minute value, by also forming the second winding as a superconducting component, which requires maintaining both windings of the current limiter suitably cooled by cryogenic medium. For this purpose the second superconducting winding must be rated to remain superconducting at the above-mentioned critical field or current intensity. Hence, when the load current rises above the given limit value, only the first winding will go normal thus eliminating the counter field normally produced by the first winding, whereas the second superconducting winding can now become fully effective.

The invention will be further described with reference to embodiments of current limiting devices according to the invention illustrated by way of example in the accompanying drawing, in which:

FIG. 1 illustrates schematically and in axial section a first device equipped with two hollow cylindrical windings;

FIG. 1a is an explanatory graph relating to the embodiment of FIG. 1;

FIG. 2 shows schematically and in section a portion of another device equipped with a stack of disc-shaped windings; and FIG. 3 is a modified schematic circuit diagram applicable to devices as shown in FIGS. 1 and 2.

The current limiter shown in FIG. 1 comprises two parallel connected windings 1 and 2 which have about equal ampere turns but have mutually opposed winding sense. The two hollow cylindrical coils are mounted coaxially within a container 3 so that each is located in the magnetic field of the other. The winding 1 consists of a superconducting material, for example niobium or lead. The winding 2 consists of aluminum or copper of a high degree of purity having a correspondingly high electrical conductivity. The enclosure 3 in which the two windings are located is constituted by a housing of heat-insulating material which is filled with liquid helium supplied and discharged through inlet and outlet ducts 4. The ends of the windings are connected to terminals 5 and 6 by means of which the device is connected into the circuit to be protected.

Instead of giving the two windings respectively different winding directions, they may have the same winding sense if the circuit connections of the respective winding are poled as shown in FIG. 3 so that the respective fields oppose each other as indicated by the arrows 1' and 2'.

The two windings are inductively interlinked. It is preferable to provide for as close an inductive coupling as feasible in order to minimize the remaining slight stray field because only the latter causes a residual reactance to be effective in the circuit being protected, since the reactances of the interlinked ampere turns of the respective windings cancel each other. By suitable choice of the material employed for the superconducting winding and/or by giving the conductor wire of this winding a suitable dimension, the critical field or current intensity of this winding is so rated that the winding will switch from superconductivity to normal conductivity when the rated current reaches the desired limit value, usually twice to three times the rated value. When this critical condition occurs, the ampere turns of the previously superconducting winding virtually vanish and the resistance increases accordingly. The current now is taken over by the other winding whose inductive reactance is fully effective.

The operation is exemplified by the graph shown in

FIG. 1a in which the abscissa denotes radial distance from the geometrical axis of the limiting device and the ordinate denotes field strength (counted in the downward direction). Curve 7 in FIG. 1a indicates the magnitude of the stray field during rated-current operation. Curve 8 indicates the magnitude of the field in the event of a short circuit and hence under conditions when the inner winding 1 according to FIG. 1 exhibits normal conductivity. Mounting the normally superconducting winding 1 within the winding 2 that remains conducting under overload conditions promotes and expedites the desired transition since the superconducting winding 1 is fully exposed to the magnetic field of the outer winding 2.

It has been mentioned that the two windings of the current limiter should be inductively intercoupled as closely as feasible in order to minimize the stray reactance active during rated-current operation. For thus securing the slightest feasible stray field, it is of advantage to subdivide the two windings by composing each of disc-shaped coils and stacking them alternately one upon the other as is exemplified in FIG. 2. Denoted by 1' are component coils of the first winding 1. Denoted by 2' are the corresponding disc coils of the other winding 2. In this embodiment the two windings are separated by a thermal insulation 9 which forms a partition in the heat-insulating enclosure so as to subdivide it into two cooling chambers 10 and 11. The coils 1' of the first winding are all located in the chamber 10 which communicates only at its upper end with the chamber 11 containing the coils 2' of the other winding. The cryogenic medium such as liquid helium passes sequentially through chambers 10 and 11. Hence after being used for cooling the first winding in chamber 10, the medium enters into chamber 11 where it cools the coils 2' of the second winding. The average temperature level of the second winding in this case is higher than that of the first winding. For example, the winding 2 may be kept at a temperature of 20° K., while the first winding is maintained at a temperature between 4.2 and 8° K.

In both illustrated embodiments the second winding or its component coils may be made of aluminum or copper wire, using a material of high purity. However, the second winding may also be made of superconducting material. In this case, the first winding, namely the one that is to convert to normal conductivity, may be made of lead, whereas the second winding, which is to remain superconducting, may be made of niobium. In such cases, the second winding must remain superconducting in the event of overload or short circuit, although the first winding will then go normal. This difference in behavior is secured, for example, by employing for the second winding a superconducting material whose critical field strength or current density is so high that it remains superconducting when the operating current rises above the limit value. This is readily obtainable when employing the two different materials just mentioned. However, the second winding may also be maintained superconducting by virtue of the fact that the dimensions of its conductor are correspondingly chosen so that the critical current density is not reached when the operating current exceeds the limit value.

The enclosure, such as the housing 3, for accommodating the windings of the current limiting device preferably consists of a cryogenic vessel of electrically non-conducting material. Particularly well suitable for this purpose is a composite material formed of synthetic plastic with embedded glass fibers.

To those skilled in the art it will be obvious upon a study of this disclosure that my invention permits of various modifications and may be given embodiments other than particularly illustrated and described herein, without departing from the essential features of my invention and within the scope of the claims annexed hereto.

I claim:
1. A current limiting device comprising two parallel connected and inductively interlinked inductance windings having mutually opposed and substantially equal ampere turns, one of said windings consisting at least partially of superconducting material and having its critical magnetic field strength at the limit value of the current to be limited to that said critical field strength is exceeded and said one winding is switched from superconductivity to normal conductivity when the current rises beyond said limit value.

2. A current limiting device according to claim 1, wherein said other winding consists of good conducting and pure normal-conducting metal, whereby the device has a high residual conductivity.

3. A current limiting device according to claim 1, wherein said other winding consists of aluminum or copper of high purity.

4. A current limiting device according to claim 1, wherein said other winding consists essentially of superconducting material and has a higher critical field strength than said one winding so as to remain superconducting when said current exceeds said limit value and said one winding is switched to normal conductivity.

5. A current limiting device according to claim 4, wherein said superconducting material of said other winding is different from that of said one winding to provide for said higher critical field strength.

6. A current limiting device according to claim 4, wherein said other winding has conductor dimensions different from those of said one winding to provide for said higher critical field strength.

7. A current limiting device according to claim 1, wherein said one winding has its turns located substantially within the magnetic field of said other winding.

8. A current limiting device according to claim 1, wherein said two windings are mounted coaxially one within the other.

9. A current limiting device comprising two parallel connected and inductively interlinked inductance windings having mutually opposed and substantially equal ampere turns, one of said windings consisting at least partially of superconducting material and having its critical magnetic field strength at the limit value of the current to be limited so that said critical field strength is exceeded and said one winding is switched from superconductivity to normal conductivity when the current rises beyond said limit value, one of said windings consisting at least partially of superconducting material, each of said windings comprising a plurality of disc-shaped coils, the coils of said respective windings being arranged in an alternating sequence, each coil of one winding being inductively interlinked with an adjacent coil of the other winding.

10. A current limiting device comprising two parallel connected and inductively interlinked inductance windings having mutually opposed and substantially equal ampere turns, one of said windings consisting at least partially of superconducting material and having its critical magnetic field strength at the limit value of the current to be limited so that said critical field strength is exceeded and said one winding is switched from superconductivity to normal conductivity when the current rises beyond said limit value, thermally insulating structure separating said one winding from said other winding, and means for maintaining said other winding at a higher temperature level than said one winding.

11. A current limiting device according to claim 10, further comprising an enclosure in which said two windings and said insulating structure are located, said insulating structure dividing said enclosure into two intercommunicating chambers containing said respective windings, and duct means for passing a cryogenic medium sequentially through said chamber containing said one winding and thence through said other chamber.

12. A current limiting device according to claim 11, wherein said enclosure consists of a cryogenic vessel formed of electrically non-conducting material.

References Cited

UNITED STATES PATENTS 3,129,359  4/1964  Kunzler _____ 335—216 XR

LEWIS H. MYERS, *Primary Examiner.*

T. J. KOZMA, *Assistant Examiner.*

U.S. Cl. X.R.

323—9, 44; 335—216; 336—60, 181, 183